United States Patent
Jarmon et al.

(10) Patent No.: US 10,105,915 B2
(45) Date of Patent: Oct. 23, 2018

(54) RIGIDIZED FIBER ARRAY

(71) Applicant: United Technologies Corporation, Hartford, CT (US)

(72) Inventors: David C. Jarmon, Kensington, CT (US); Wayde R. Schmidt, Pomfret Center, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/917,413

(22) PCT Filed: Aug. 20, 2014

(86) PCT No.: PCT/US2014/051829
§ 371 (c)(1),
(2) Date: Mar. 8, 2016

(87) PCT Pub. No.: WO2015/038302
PCT Pub. Date: Mar. 19, 2015

(65) Prior Publication Data
US 2016/0221277 A1    Aug. 4, 2016

Related U.S. Application Data

(60) Provisional application No. 61/876,416, filed on Sep. 11, 2013.

(51) Int. Cl.
*B29C 70/54* (2006.01)
*B29C 70/46* (2006.01)
(Continued)

(52) U.S. Cl.
CPC .......... *B29C 70/543* (2013.01); *B29C 70/025* (2013.01); *B29C 70/467* (2013.01);
(Continued)

(58) Field of Classification Search
CPC ... B29C 70/543; B29C 70/467; B29C 70/025; B29C 70/20; B29K 2509/02;
(Continued)

(56) References Cited

U.S. PATENT DOCUMENTS 2,775,022 A * 12/1956 Davis .................... B29B 15/125
                                                        428/392
3,686,048 A     8/1972 Schirtzinger
(Continued)

FOREIGN PATENT DOCUMENTS

EP    0367711 A1    5/1990
EP    0833804       9/2000

OTHER PUBLICATIONS

International Preliminary Report on Patentability for PCT Application No. PCT/US2014/051829 completed Mar. 15, 2016.
(Continued)

*Primary Examiner* — Camie S Thompson
(74) *Attorney, Agent, or Firm* — Carlson, Gaskey & Olds, P.C.

(57) ABSTRACT

A composite component includes a fiber array, a plurality of platelets bridging between fiber filaments of the fiber array and rigidizing the fiber array, and a resin-based phase disposed within voids of the fiber array. A method of making a composite component is also disclosed.

18 Claims, 7 Drawing Sheets

(51) Int. Cl.
*B29C 70/02* (2006.01)
*C04B 35/80* (2006.01)
*B29K 105/08* (2006.01)
*B29K 505/00* (2006.01)
*B29K 509/02* (2006.01)

(52) U.S. Cl.
CPC .......... *C04B 35/80* (2013.01); *B29K 2105/08* (2013.01); *B29K 2505/00* (2013.01); *B29K 2509/02* (2013.01)

(58) Field of Classification Search
CPC ..... B29K 2505/00; C04B 35/80; B29B 15/12; D04H 3/12; C08J 5/06; C03C 25/26; D02G 3/00; D01F 6/00
USPC ........ 264/261; 428/103, 608, 378, 381, 389, 428/366; 427/531, 576
See application file for complete search history.

(56) References Cited

U.S. PATENT DOCUMENTS

| | | |
|---|---|---|
| 4,132,828 A | 1/1979 | Nakamura et al. |
| 2002/0037391 A1 | 3/2002 | Harpell et al. |
| 2007/0111001 A1 | 5/2007 | Bittle et al. |
| 2013/0225721 A1 | 8/2013 | Hoppe |
| 2014/0145367 A1 | 5/2014 | Li et al. |

OTHER PUBLICATIONS

Cardinal, S. et al. (1999). Fracture behavior of hybrid platelet-fiber alumina performs. Journal of Materials Science, 34(1), p. 71-75.
International Search Report for PCT Application No. PCT/US2014/051829 completed Dec. 15, 2014.
Supplementary European Search Report for European Patent Application No. 14843531.6 (3044356), completed Jul. 17, 2017.

* cited by examiner

RIGIDIZED FIBER ARRAY

CROSS-REFERENCE TO RELATED APPLICATION

This application claims priority to U.S. Provisional Application No. 61/876,416, filed Sep. 11, 2013.

BACKGROUND

This disclosure relates to a rigidized fiber array for a composite material.

Composite materials can include reinforcement fibers dispersed in a matrix material. The matrix material can be applied to the fibers after arranging the fibers in a desired pattern.

SUMMARY

A composite component according to an example of the present disclosure includes a fiber array, a plurality of platelets bridging between fiber filaments of the fiber array and rigidizing the fiber array, and a matrix phase disposed within voids of the fiber array.

In a further embodiment of the foregoing embodiment, the platelets include at least one of silicon, boron, hafnium, zirconium, yttrium and ytterbium, alumina, ceria, silica, tin oxide, titania, zinc oxide, zirconia, hafnia, ytterbia and yttria.

In a further embodiment of any of the foregoing embodiments, the component further includes a reaction product formed from a reaction between a constituent of the platelets and carbon of the resin-based phase.

In a further embodiment of any of the foregoing embodiments, the constituent of the platelet is a metal.

In a further embodiment of any of the foregoing embodiments, the platelets have an orientation relative to the fiber filaments, and wherein the orientation is perpendicular to the fiber filaments.

In a further embodiment of any of the foregoing embodiments, the platelets contribute to at least one of a wear resistance, heat resistance, oxidation resistance, and impact resistance of the component.

In a further embodiment of any of the foregoing embodiments, the platelets increase the glass transition temperature of the component relative to an unrigidized component.

In a further embodiment of any of the foregoing embodiments, the platelets bridge between the fiber filaments such that the voids are formed to receive the resin-based phase.

A method of making a composite component according to an example of the present disclosure includes applying a colloidal suspension to a fiber array, precipitating the colloidal suspension to rigidize the fiber array, and impregnating the rigidized fiber array with a resin to form a component.

In a further embodiment of any of the foregoing embodiments, the impregnating step includes placing the rigidized fiber array into a mold and applying the resin to the mold.

In a further embodiment of any of the foregoing embodiments, the method further includes changing the viscosity of the resin prior to applying the resin to the mold.

In a further embodiment of any of the foregoing embodiments, the method further includes curing the component subsequent to the impregnating step.

In a further embodiment of any of the foregoing embodiments, curing includes at least one of pyrolysis and thermal treatment.

In a further embodiment of any of the foregoing embodiments, the precipitating step includes cooling the colloidal suspension.

In a further embodiment of any of the foregoing embodiments, the method further includes heating the fiber array subsequent to the precipitating step.

In a further embodiment of any of the foregoing embodiments, the precipitating step provides voids between fibers filaments of fiber filament bundles of the fiber arrays.

In a further embodiment of any of the foregoing embodiments, the voids receive the resin during the impregnating step.

In a further embodiment of any of the foregoing embodiments, the method further includes reacting the colloidal suspension with carbon in the resin.

In a further embodiment of any of the foregoing embodiments, the precipitating step restricts fiber filaments of the fiber array from moving relative to one another within the array during the impregnating step.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2b is a higher magnification of the micrograph of FIG. 2a.

DETAILED DESCRIPTION

Figure 1:
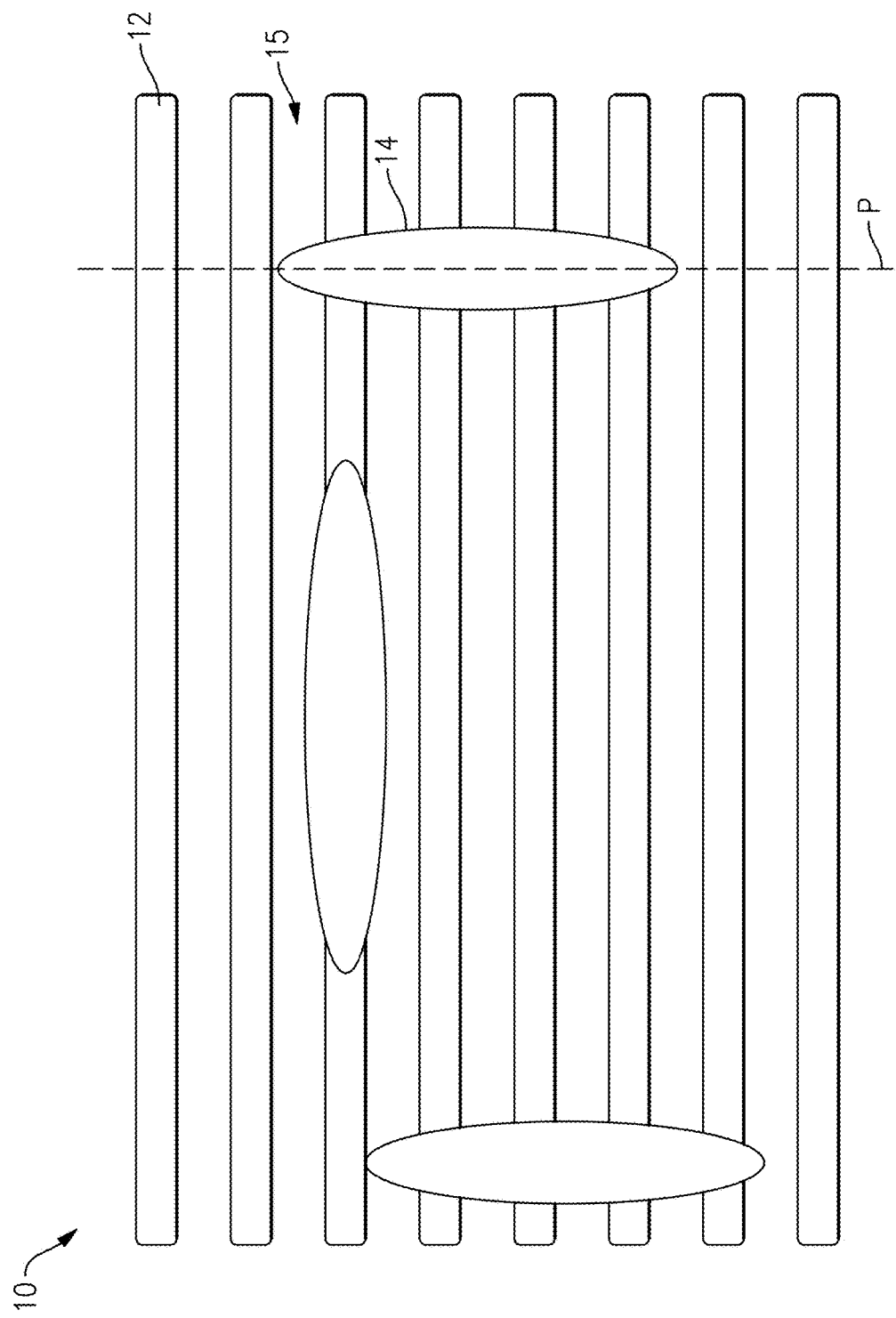
FIG. 1 schematically illustrates an example rigidized fiber array.
Figure 2A:
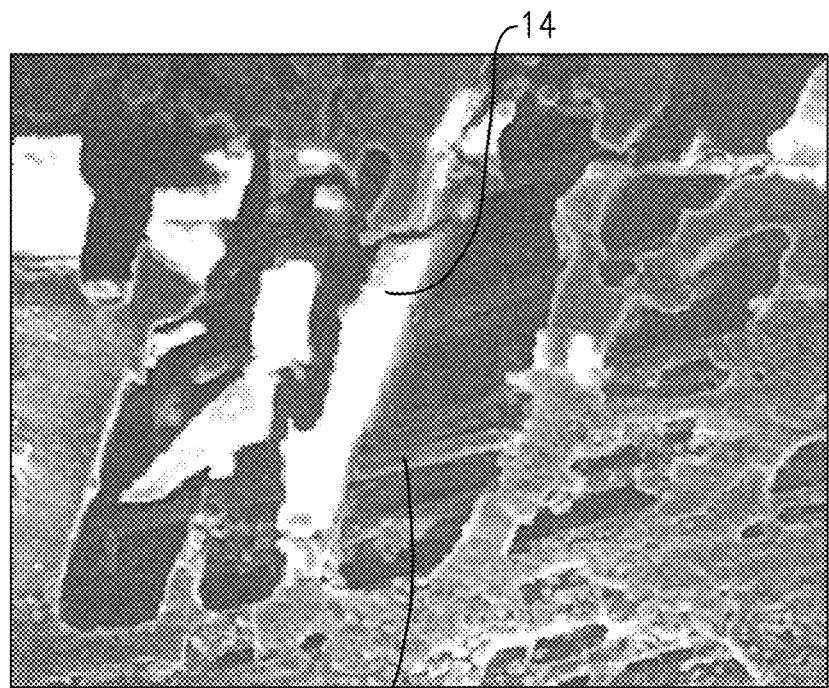
FIG. 2a is a micrograph of the rigidized fiber array of FIG. 1.
Figure 2B:
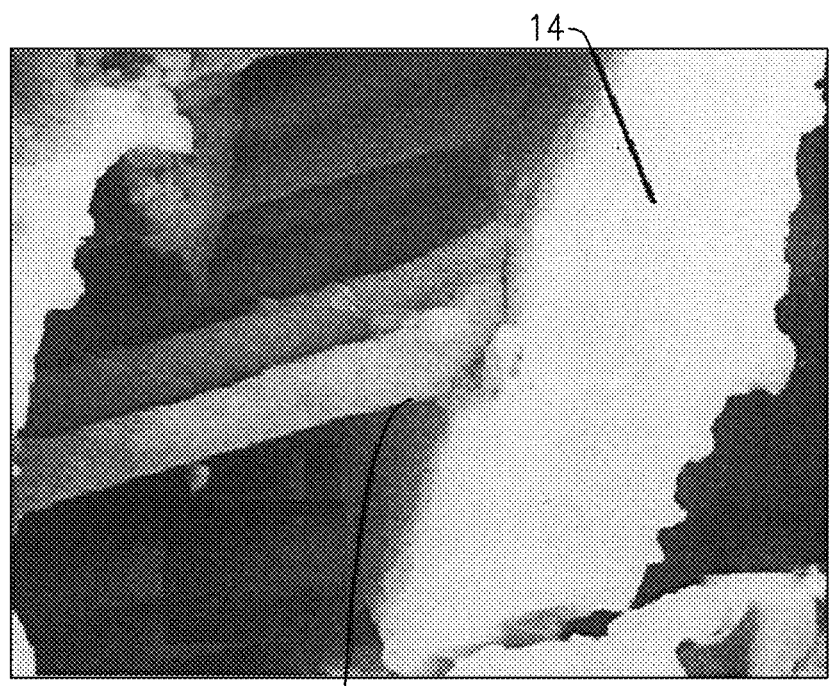

FIG. 1 schematically illustrates a rigidized fiber array 10. FIG. 2a is a micrograph of the rigidized fiber array 10, and FIG. 2b is a higher magnification of the micrograph of FIG. 2a. Fibers filaments 12 are arranged in the array 10. In this example, multiple fibers 12 are arranged parallel to one another. However, in other examples, the fibers 12 may be randomly arranged in the array 10, or the array 10 may include fibers of multiple orientations. The fibers 12 are rigidized by platelets 14 bridging between the fibers 12. The platelets 14 have a generally flat, plate-like structure oriented along an axis P (FIG. 1), which can be oriented with respect to the fibers 12. In the example of FIG. 1, the platelet axis P is substantially perpendicular to the fibers 12. The platelets 14 nucleate and grow from a surface of the fibers 12, so they tend to be perpendicular to the axis of fibers 12 and the fibers 12 pass through the platelets 14. In between the fibers 12 are voids 15. The platelets 14 can intersect an individual fiber 12 or several adjacent fibers 12. The number of platelets 14 relative to the number of fibers 12 can be adjusted by controlling certain experimental conditions.

Figure 3:
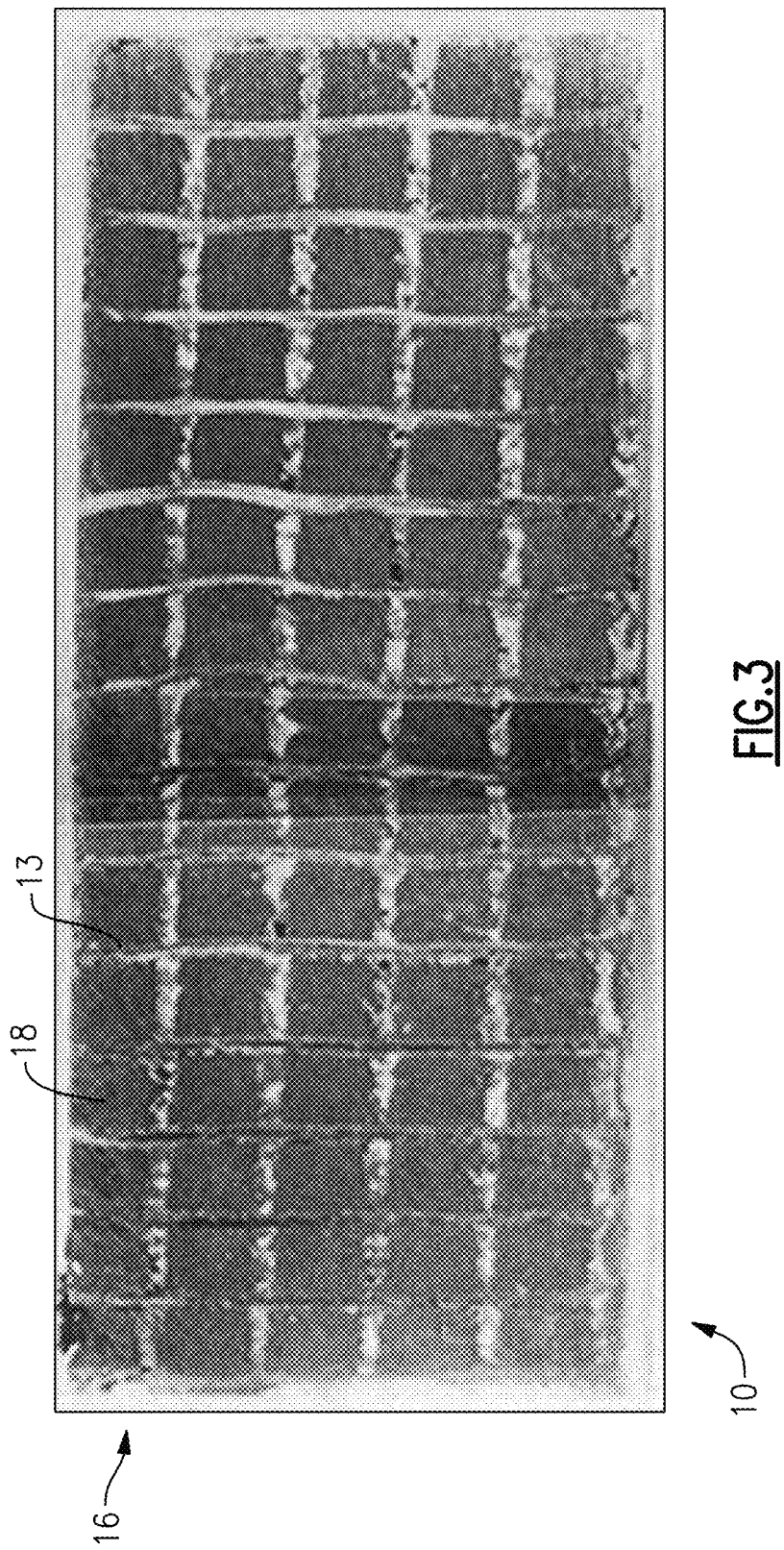
FIG. 3 is a micrograph of a composite component including the rigidized fiber array of FIGS. 1-2b.

FIG. 3 is a micrograph of a composite component 16 including a rigidized fiber array 10. The fiber array 10 can include multiple fiber filaments 12 arranged in bundles known as "tows" 13. In the example of FIG. 3, the tows 13 are arranged in an orthogonal three-dimensional pattern. In other examples, the tows 13 can be arranged in other types of patterns, or may be woven, braided, stitched or otherwise assembled together. In a further example, multiple layers of fiber arrays 10 can be stacked. Within the tows 13, a resin-based matrix material 18 (which may be preceramic, polymeric, organic, metallic, ceramic, or a combination thereof) surrounds the fiber filaments 12. The matrix 18 also surrounds the tows 13.

The platelets 14 (FIGS. 1-2b) contribute to the properties of the composite component 16. For example, the platelets 14 can improve the heat resistance, wear resistance, oxidation resistance and/or impact resistance of the composite component 16. The platelets 14 can also increase the elastic modulus, compressive strength, fracture toughness, glass transition temperature and/or interlaminar strength of the composite component 16. Improvements in the properties of the composite component 16 may depend on the matrix 18 material. For example, if the matrix 18 is polymer-based, the composite component 16 may exhibit improved wear resistance, heat resistance, and an increased glass transition temperature. If the matrix 18 is preceramic-based, the composite component 16 may experience increased wear resistance, heat resistance, and impact resistance.

Figure 4:
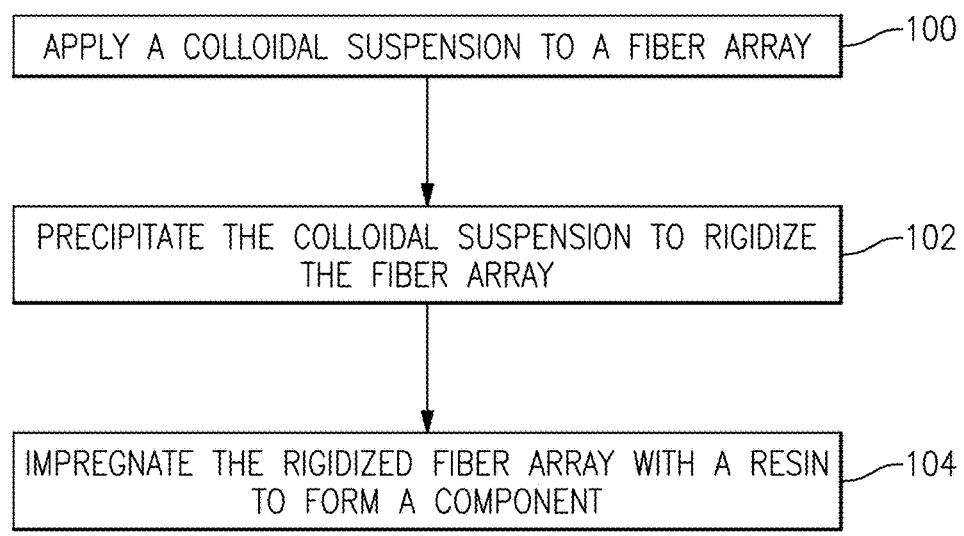
FIG. 4 is a flowchart of a method of rigidizing a fiber array.

FIG. 4 is a flowchart of a method of rigidizing the fiber array 10 (FIGS. 1-3). In step 100, a colloidal suspension is applied to the fiber array 10. The fiber array 10 may be provided in a fixture, such as a metallic fixture, during subsequent processing steps. In one example, the fiber array 10 is heat treated to remove fiber 12 sizing and other organic material. The colloidal suspension can be selected from a dispersion of metals, carbon and/or inorganic materials, in a medium such as an aqueous-based liquid phase. Metal colloids include those based on silicon, boron, hafnium, zirconium, yttrium and ytterbium. Inorganic colloidal suspensions include alumina, ceria, silica, tin oxide, titania, zinc oxide, zirconia, hafnia, ytterbia and yttria. In a particular example, Ludox® AS (Sigma-Aldrich Co. LLC, St. Louis, Mo.) colloidal silica can be used. In one example, the colloidal suspension can include a reactive constituent, such as a metal, which can react with carbon in the matrix material 18 (FIG. 3) to form a reaction product. The reaction product may further contribute to the properties of the composite component 16 as was discussed above.

In step 102, the colloidal suspension is precipitated to form the platelets 14 (FIGS. 1-2b) and rigidize the fiber array 10. The rigidized fiber array 10 exhibits increased rigidity relative to an unrigidized fiber array. That is, the fibers 12 in the rigidized fiber array 10 have decreased mobility relative to one another, and are restricted from moving relative to one another, as compared to fibers in an unrigidized fiber array. The platelets 14 maintain voids 15 between the fibers 12 (FIG. 1) such that the matrix 18 (FIG. 3) can infiltrate and flow within the voids 15. The platelets 14 also maintain the desired arrangement of the fibers 12 in the fiber array 10 during subsequent processing steps.

Figure 5A:
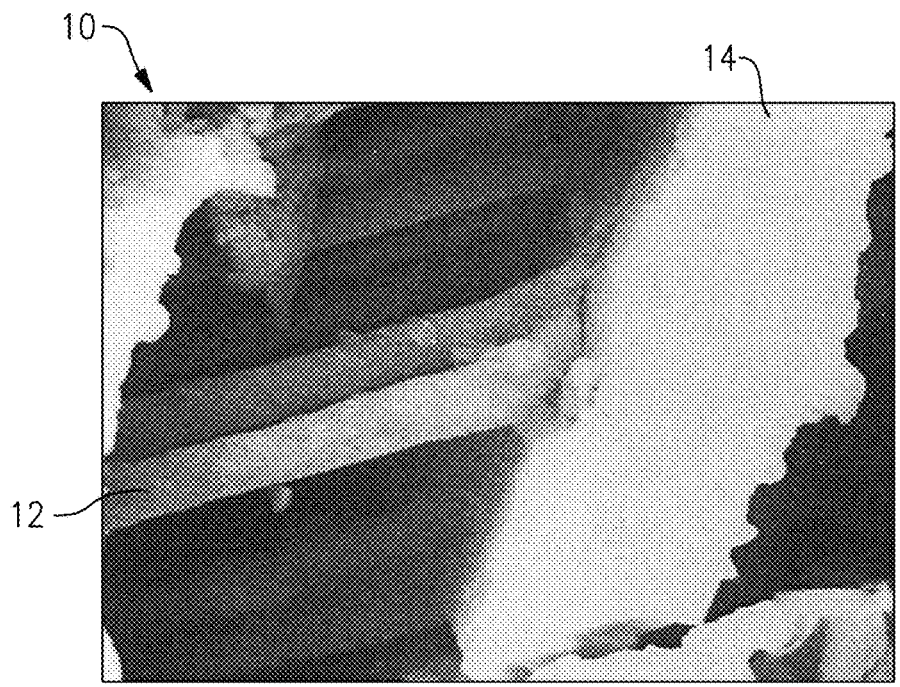
FIG. 5a is a micrograph of including the rigidized fiber array of FIGS. 1-2b cooled to 0° C.
Figure 5B:
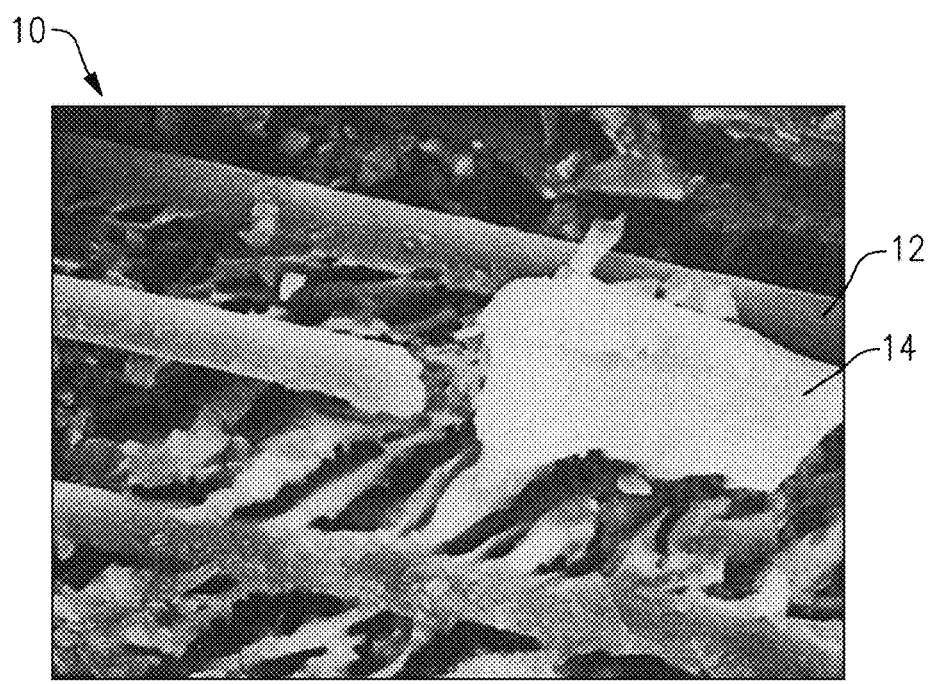
FIG. 5b is a micrograph of including the rigidized fiber array of FIGS. 1-2b cooled to −196° C.

Precipitation can occur by cooling the suspension. The cooling temperature and cooling rate affect the size of the precipitated platelets 14. The lower the cooling temperature, the smaller the platelets 14. FIG. 5a shows a micrograph of a rigidized fiber array 10 cooled to 0° C., while FIG. 5b shows a micrograph of a rigidized fiber array 10 cooled to −196° C. The platelets 14 of FIG. 5b are smaller than those of FIG. 5a. In addition, in the process of cooling to precipitate the platelets 14 from the colloidal suspension, the platelets 14 spread the fiber filaments 12 within the tows 13 which facilitates infiltration of the matrix material 18 into the rigidized fiber array 10 in the matrix impregnation step 104, discussed below. In one example, the rigidized fiber array 10 is heated to dry the rigidized fiber array 10 subsequent to the precipitation step 102. In one example, the rigidized fiber array 10 can be dried in an oven. In another example, the liquid phase of the colloidal suspension is removed following precipitation by heating, exposure to reduce pressure (i.e. vacuum) or a combination of these in a single or a series of such exposures (i.e. heat then evacuate then heat). In step 104, the rigidized fiber array is then impregnated with the matrix material 18 (FIG. 3).

Figure 6A:
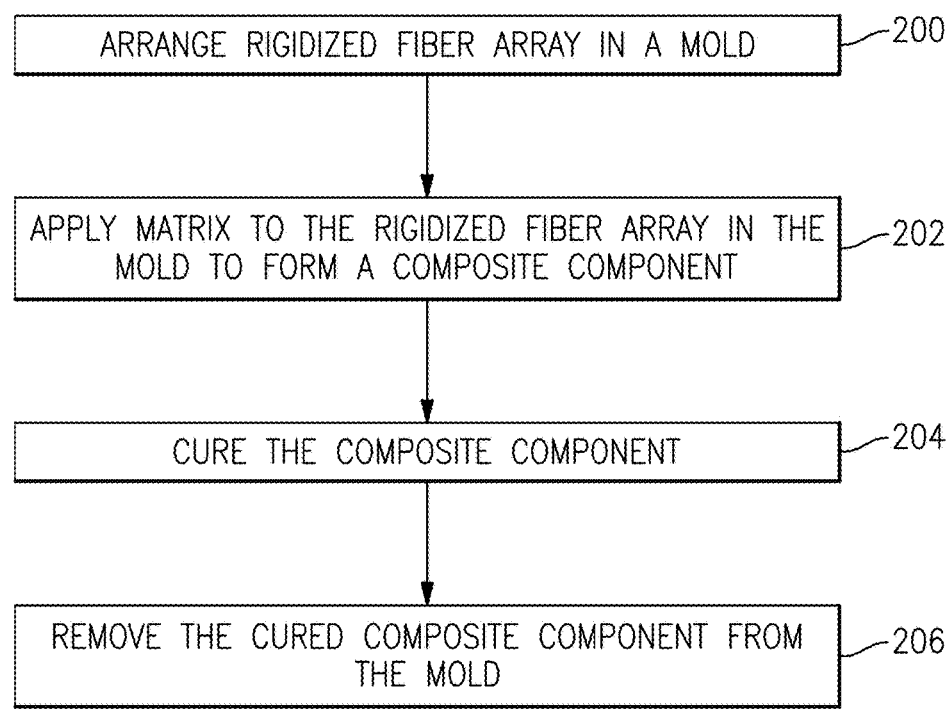
FIG. 6a is a flowchart of a method of making a composite component.
Figure 6B:
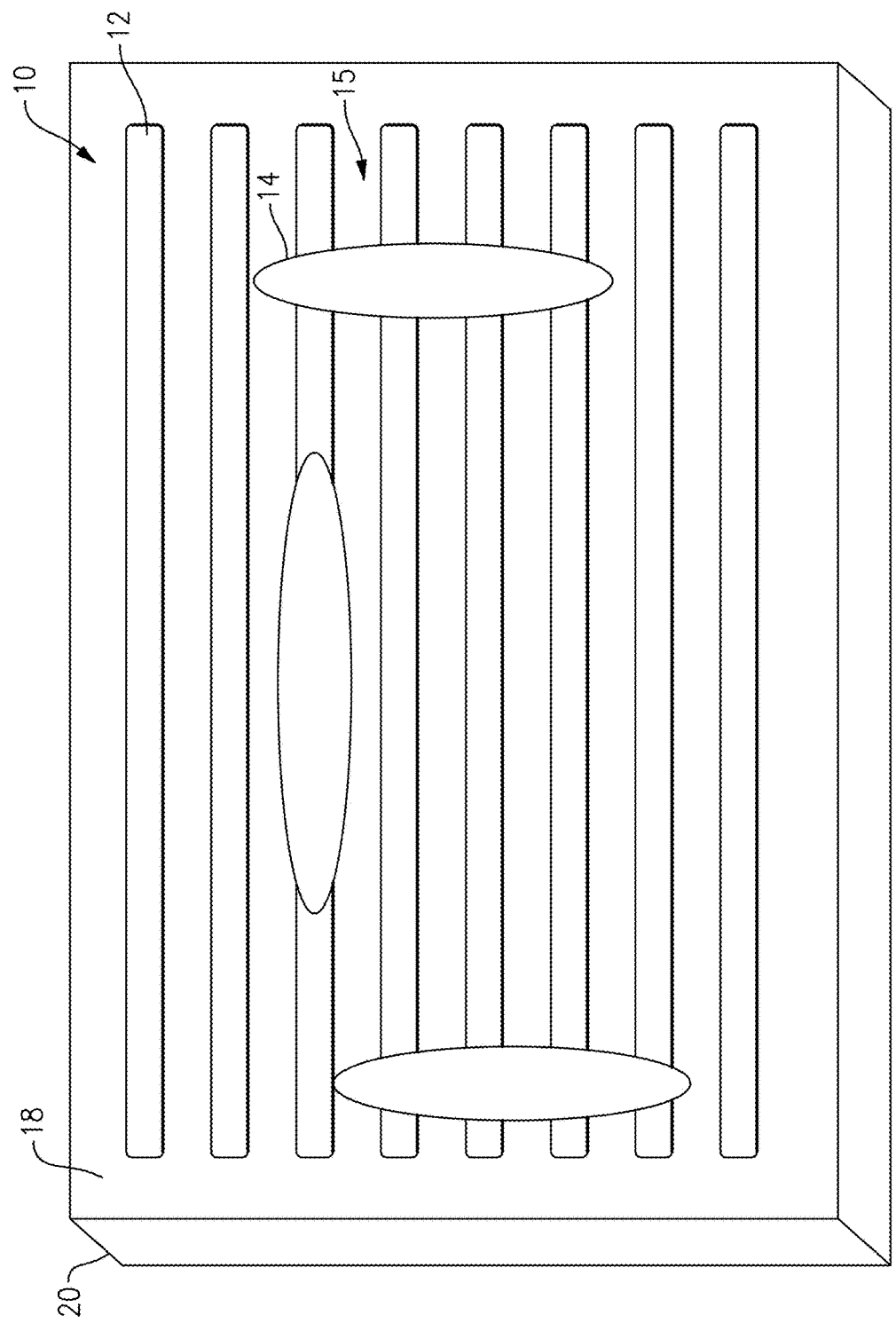
FIG. 6b schematically illustrates an example composite component including the rigidized fiber array of FIGS. 1-5b during molding.

The rigidized fiber array 10 can be molded into a composite component 16 (FIG. 3). FIG. 6 is a flowchart of a method of molding a composite component 16 from a rigidized fiber array 10. In step 200, the rigidized fiber array 10 is arranged in a mold 20, as is shown in FIG. 6b. In one example, the mold 20 is metallic. In step 202, the matrix 18 is applied to the rigidized fiber array 10 in the mold 20 to form a composite component 16 (FIG. 3). The matrix 18 infiltrates and flows within the voids 15. The maintenance of the voids 15 by the platelets 14 allows uniform matrix 18 infiltration throughout the rigidized fiber array 10.

The matrix material 18 can be heated to achieve a desired viscosity for application to the rigidized fiber array 10. The fibers 12 are maintained in the desired arrangement by the rigidizing platelets 14 during the matrix 18 application step 202.

In step 204, the composite component 16 (FIG. 3) is cured. The curing step 204 can include pyrolysis if the matrix 18 includes a ceramic precursor (such as a preceramic polymer). In other examples, the curing step 204 can include a thermal treatment such as heating or cooling, polymerization, exposure to radiation (e.g. visible light, UV, IR, microwave, gamma ray, or e-beam) or other curing processes. In step 206, the cured composite component 16 is removed from the mold 20. Depending on the type of matrix material 18, as is discussed below, the cured composite component 16 may be, for example, a ceramic matrix composite (CMC) material or an organic matrix composite (OMC) material.

Some examples of the matrix material 18 are thermoplastic or thermosetting organic polymers. Other examples are preceramic polymers. In this example, the component is thermally treated to convert the preceramic polymer to ceramic material. The preceramic polymers can have a stoichiometric excess of carbon to react with the metal or metals of the platelets 14 for form metal carbides. Thus, the platelets 14 can serve the dual purpose of reinforcing the fiber array 10 during molding and also forming phases that favorably modify the properties of the component 16.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite component, comprising:
   a fiber array, a plurality of platelets bridging between fiber filaments of the fiber array and rigidizing the fiber array;

a matrix phase disposed within voids of the fiber array; and a reaction product formed from a reaction between a constituent of the platelets and carbon of the matrix phase.

2. The component of claim 1, wherein the platelets include at least one of silicon, boron, hafnium, zirconium, yttrium and ytterbium, alumina, ceria, silica, tin oxide, titania, zinc oxide, zirconia, hafnia, ytterbia and yttria.

3. The component of claim 1, wherein the constituent of the platelet is a metal.

4. The component of claim 1, wherein the platelets have an orientation relative to the fiber filaments, and wherein the orientation is perpendicular to the fiber filaments.

5. The component of claim 1, wherein the platelets contribute to at least one of a wear resistance, heat resistance, oxidation resistance, and impact resistance of the component.

6. The component of claim 1, wherein the platelets increase the glass transition temperature of the component relative to an unrigidized component.

7. The component of claim 1, wherein the platelets bridge between the fiber filaments such that the voids are formed to receive the matrix.

8. A method of making a composite component, comprising:

applying a colloidal suspension to a fiber array;

precipitating the colloidal suspension to rigidize the fiber array; and impregnating the rigidized fiber array with a resin to form a component; and reacting the colloidal suspension with the resin.

9. The method of claim 8, wherein the impregnating step includes placing the rigidized fiber array into a mold and applying the resin to the mold.

10. The method of claim 9, further including changing the viscosity of the resin prior to applying the resin to the mold.

11. The method of claim 8, further including curing the component subsequent to the impregnating step.

12. The method of claim 11, wherein curing includes at least one of pyrolysis and thermal treatment.

13. The method of claim 8, wherein the precipitating step includes cooling the colloidal suspension.

14. The method of claim 13, further comprising heating the fiber array subsequent to the precipitating step.

15. The method of claim 8, wherein the precipitating step provides voids between fibers filaments of fiber filament bundles of the fiber arrays.

16. The method of claim 15, wherein the voids receive the resin during the impregnating step.

17. The method of claim 16, wherein the reacting comprises reacting the colloidal suspension with carbon in the resin.

18. The method of claim 8, wherein the precipitating step restricts fiber filaments of the fiber array from moving relative to one another within the array during the impregnating step.

* * * * *